United States Patent [19]
Kunze et al.

[11] Patent Number: 5,400,645
[45] Date of Patent: Mar. 28, 1995

[54] METHOD AND APPARATUS FOR ULTRASONIC LEAK LOCATION

[75] Inventors: Ulrich Kunze; Walter Knoblach, both of Erlangen; Günther Schulze, Fürth, all of Germany

[73] Assignee: Siemens Aktiengesellschaft, Munich, Germany

[21] Appl. No.: 109,386

[22] Filed: Aug. 19, 1993

[30] Foreign Application Priority Data

Aug. 19, 1992 [DE] Germany .................. 42 27 458.3

[51] Int. Cl.$^6$ ............................................. G01M 3/24
[52] U.S. Cl. ................................. 73/40.5 A; 364/550
[58] Field of Search ................. 73/40.5 A, 587, 592; 364/509, 550

[56] References Cited

U.S. PATENT DOCUMENTS

| | | | |
|---|---|---|---|
| 3,814,207 | 6/1974 | Kusada et al. | 73/40.5 A |
| 4,321,528 | 3/1982 | Reichel et al. | 324/77 D |
| 4,457,163 | 7/1984 | Jäckle | 73/40.5 A |
| 4,640,121 | 2/1987 | Leuker et al. | 73/40.5 A |
| 4,858,462 | 8/1989 | Coulter et al. | 73/40.5 A |
| 5,031,446 | 7/1991 | Saito et al. | 73/40.5 A |

FOREIGN PATENT DOCUMENTS

| | | |
|---|---|---|
| 0091087 | 10/1983 | European Pat. Off. . |
| 0140174 | 12/1987 | European Pat. Off. . |
| 0444200 | 9/1991 | European Pat. Off. . |
| 0451649 | 10/1991 | European Pat. Off. . |
| 2503363 | 10/1982 | France . |
| 2916158 | 10/1980 | Germany . |
| 0152415 | 11/1981 | Germany . |
| 3240136 | 5/1984 | Germany . |
| 3334252 | 4/1985 | Germany . |
| 3336245 | 4/1985 | Germany . |
| 3726585 | 2/1989 | Germany . |
| 3812101 | 11/1989 | Germany . |
| 58-034334 | 2/1983 | Japan . |
| 63-070139 | 3/1988 | Japan . |
| 1710930 | 2/1992 | Russian Federation . |
| 1446554 | 12/1988 | U.S.S.R. . |

OTHER PUBLICATIONS

"Detect buried steam leaks with acoustics", Sabo, Electrical World, vol. 186, No. 1, Jul. 1, 1976, p. 40.
Siemens Publ., Order No. A19100-&653-A212 (1990), pp. 2-12 "Alies Acoustic Leakage Monitoring System".
American Society for Nondestr. Testing, 7/92, pp. 875-882 (Fowler) "Chemical Industry Application of Acoustic Emission".
American Society for Nondestr. Testing, 11/89, pp. 1297-1300 (Kuperman) "Characterization of Acoustic Signals From Leaking Intergranukan".
Technisches Messen 58 (1991), pp. 47-60 (Fuchs et al.) "Acoustic Leak Detection on District Heating Pipelines".
German Search Report.
Lord et al., "Attenuation of Elastic Waves in Pipelines as Applied to Acoustic Emission Leak Detection", Materials Evolution, 11/77, pp. 49-54.

*Primary Examiner*—Hezron E. Williams
*Assistant Examiner*—Michael J. Brock
*Attorney, Agent, or Firm*—Herbert L. Lerner; Laurence A. Greenberg

[57] ABSTRACT

A method for ultrasonic leak location includes showing sound levels in a bar diagram at various locations along a measurement segment. The measuring segment is divided into subsegments with intrinsically uniform damping. Effective portions are obtained by multiplying the subsegments by the associated damping coefficient, and an effective portion is assigned to each of the subsegments. Corresponding effective measuring positions are ascertained for the measuring locations within the effective portions. Respective logarithmized net sound levels are plotted through the ascertained effective measuring locations and two inclined straight lines are produced as a result. An intersection of the straight lines in the bar diagram is ascertained for identifying a leak point. An apparatus for ultrasonic leak location includes a number of ultrasound pickups being disposed at measuring locations along a measuring segment, a data processing computer, amplifiers and components forming an effective value. The amplifiers and the components are connected between outputs of the ultrasound pickups and the data processing system.

5 Claims, 2 Drawing Sheets

DPS  Data Processing System  A  Amplifier
EV  components forming an Effective Value  UP  Ultrasound Pickup
MS  measurement segment of Affected Component C

METHOD AND APPARATUS FOR ULTRASONIC LEAK LOCATION

BACKGROUND OF THE INVENTION

FIELD OF THE INVENTION

The invention relates to a method for ultrasonic leak location, in which sound levels measured at various sites along a measurement segment are represented in a bar diagram, and in which the intersection of two straight lines in the bar diagram is ascertained to identify the location of the leakage. The invention also relates to an apparatus for performing the method.

A method and an apparatus of the above-mentioned type are known from European Patent No. 0 140 174, particularly FIG. 5, and from a brochure entitled "ALÜS Acoustical Leakage Monitoring System, Order No. A19100-U653-A212, April 1990, published by Siemens A. G., Energy Production Division, D-91050 Erlangen, Germany.

The method of acoustical leakage monitoring under consideration herein is based on the fact that liquids, vapors or gases produce structure-borne sound as they flow out of a leak and in case of vapors and gases expand. The noises are propagated in affected components (such as pipelines, containers, pumps, valves) and are measured by sound transducers or sound pickups. The latter are mounted at certain intervals on the surface of the components being monitored.

The effective or r.m.s. value $E$ (r.m.s.=root mean square) of the high-frequency sound transducer signals $E_{HF}$ is used as a measuring variable according to the formula:

$$E = \sqrt{\frac{1}{T} \int E_{HF}^2 \cdot dt} = \left(\frac{1}{T} \int E_{HF}^2 \cdot dt\right)^{0.5}. \quad (1)$$

During normal operation, the flow noises generate a background signal level $E_o$. The sudden occurrence of a leak generates a leakage noise level $E_L$ at a location $x_i$ of the sound transducer ($i=1, 2, \ldots$), having a magnitude which depends on the size of the leak and on its distance from the sound transducer. A total noise level $E_{L,o}$ at the location $x_i$ of a transducer is the result of superposition of the leakage noise and operating noise, in accordance with the following formula:

$$E_{L,o} = (E_o^2 + E_L^2)^{0.5}. \quad (2)$$

That means that a leak which generates the same noise level as the operating noise at the location $x_i$ of the sound pickup raises the total noise level by approximately 40%, which is a rise that is readily measurable.

In order to locate the leak, the proportion determined by the leak noise must first be determined for each measuring site $x_i$, from the sound levels measured by the pickups. That is done in a known way by subtracting the background noise of the system, $E^2_o$, in accordance with the following formula:

$$E^2_L = E^2_{L,o} - E^2_o. \quad (3)$$

The net sound levels $E^2_L$ (or the corresponding values $E_L$) at the i different locations $x_i$ along the measuring segment are logarithmically shown in a bar diagram and, if a leak is present, the intersection of two straight lines, which will then be present, is utilized to identify the leakage location $x_L$. (When using the values $E_L$ instead of $E^2_L$ the same final results are obtained.)

In other words, in the method under consideration herein, the operating sound level (r.m.s. value) is monitored for anomalous changes in the ultrasonic range, using a plurality of permanently installed pickups. The frequency range is chosen in such a way that the high-frequency proportions of the leak noise that are above the operating sound level are detected, but the low-frequency, mechanically induced sound waves are filtered out. During normal operation, the r.m.s. values of the various pickups are largely constant. Conversely, leaks cause an increase in the values. Through the use of the known method, the proportion that can be ascribed solely to the leak is determined from that rise for each pickup. That proportion decreases according to the laws of physics as the distance from the leak increases. As was already noted, that proportion is represented logarithmically as a function of the various pickup locations $x_i$ in the form of a bar diagram. Relatively long pipelines or branching pipelines are split up into monitoring segments, and for each segment one such bar diagram is prepared.

The former location method requires constant sound damping along the particular measuring path. Local differences are compensated for by means of special calibration by calculation when use of the method in a system begins. However, experience has shown that when the method is employed in the primary loop of a nuclear power plant, for instance, very great differences arrive in the damping coefficients between the pipelines and individual components of the system (flanges, pumps, steam generators, etc.). Those differences in damping coefficients may amount to a factor of ten or more among one another. Locating is consequently performed with an averaged and therefore locally incorrect damping coefficient, which necessarily leads to defective location of the leak point. Defective location occurs especially if a major change in damping over a short distance is found in the vicinity of the leak point.

SUMMARY OF THE INVENTION

It is accordingly an object of the invention to provide a method and an apparatus for ultrasonic leak location, which overcome the hereinafore-mentioned disadvantages of the heretofore-known methods and devices of this general type and which enable more accurate leakage location.

With the foregoing and other objects in view there is provided, in accordance with the invention, a method for ultrasonic leak location, which comprises showing sound levels in a bar diagram at various locations along a measurement segment; dividing the measuring segment into subsegments with intrinsically uniform damping; obtaining effective portions by multiplying the subsegments by the associated damping coefficient, and assigning an effective portion to each of the subsegments; ascertaining corresponding effective measuring positions for the measuring locations within the effective portions; plotting respective logarithmized net sound levels through the ascertained effective measuring locations in a known manner, and producing two inclined straight lines as a result; and ascertaining an intersection of the straight lines in the bar diagram for identifying a leak point.

In accordance with another mode of the invention, there is provided a method which comprises displaying the leak location on a screen or on a printout of a plotter.

With the objects of the invention in view, there is also provided an apparatus for ultrasonic leak location, comprising a number of ultrasound pickups being disposed at measuring locations along a measuring segment and having outputs; a data processing system; amplifiers; and components forming an effective value, the amplifiers and the components being connected between the outputs of the ultrasound pickups and the data processing system; the data processing system being a computer having means for determining effective measuring positions from the measuring locations while taking damping along the measuring segment into account, means for preparing a bar diagram with the effective measuring positions with the aid of logarithmized effective values, means for inscribing two straight lines of different or opposite slope into the bar diagram, and means for characterizing an actual leak point by determining the intersection of the lines.

In accordance with a concomitant feature of the invention, at least two of the ultrasonic pickups are positioned within two subsegments each having the same damping.

The invention is thus based on the concept that it is advantageous to introduce an "effective geometry". This "effective geometry" serves to take into account the actual locally varying sound damping. A system or component to be monitored includes successively disposed portions and pipelines, each of which have sound damping coefficients differing from one another. In practice, these differing sound damping coefficients are known, or at least can be ascertained by trial and error. Other features which are considered as characteristic for the invention are set forth in the appended claims.

Although the invention is illustrated and described herein as embodied in a method and an apparatus for ultrasonic leak location, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
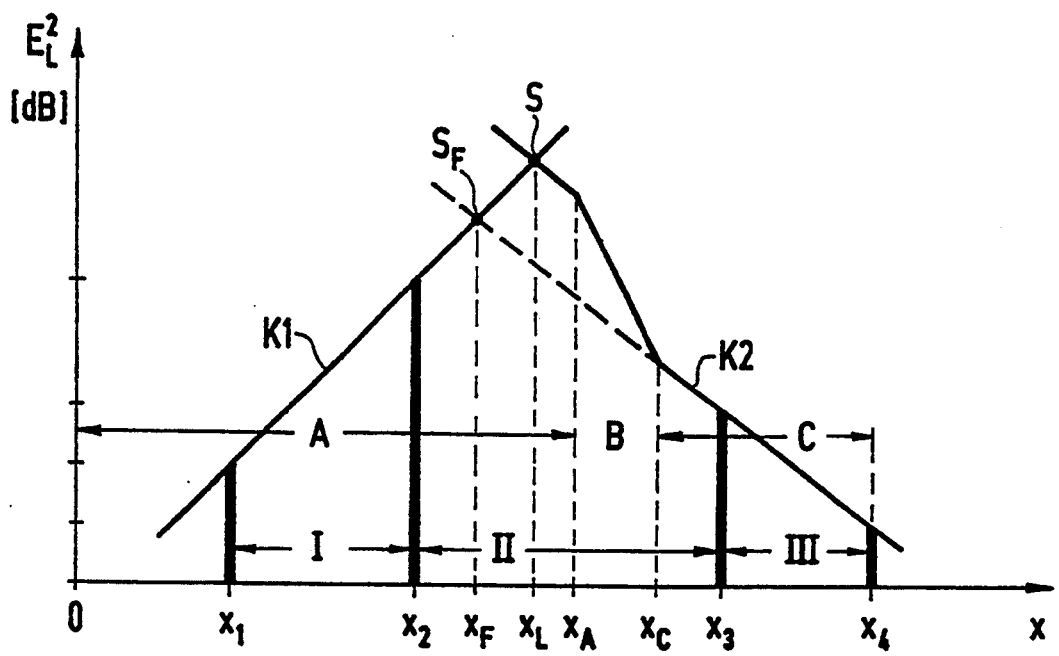
FIG. 1 is a bar diagram illustrating the stated problem and showing logarithmized r.m.s. values of various sensors along a monitoring segment as a function of individual measuring positions $x_i$.

Referring now to the figures of the drawing in detail and first, particularly, to FIG. 1 thereof, it is assumed for the sake of simplicity that ultrasonic pickups are mounted at only four measuring positions or measuring points $x_1$, $x_2$, $x_3$ and $x_4$ along a monitoring segment in a pressure-carrying system (such as the primary loop of a nuclear power plant). The monitoring or measuring segment, which extends from 0 to the measuring position $x_4$, is thereby divided into segments I, II and III. In practice, however, 30 to 40 such measuring positions are monitored, for instance. In the present case, logarithmized sound levels $E^2_L$ at each measuring position $x_i$ are entered in the form of a bar. If a number of closely spaced sensors were to be used, two contrary curves K1 and K2 would be obtained, that would intersect at a point S at the actual leakage location $x_L$. The curve K1 is a straight line. The curve K2 is a bent curve. In other words, it is assumed that in the course of travel between the measuring positions $x_2$ and $x_3$, a subsegment or a segment B is present that has a uniformly high damping $\alpha_2$. Conversely, in two segments A and C, a lesser damping $\alpha_1$ and $\alpha_3$ uniformly prevails. The measuring positions $x_1$ and $x_2$ are located in the segment A, and the measuring positions $x_3$ and $x_4$ are located in the segment C. Boundaries of the segment B are marked by reference symbols $x_A$ and $x_C$. In an actual case there would be a number of segments A, B, etc., having different damping coefficients $\alpha_1$, $\alpha_2$, etc.

In the conventional method for ultrasonic leakage location, compensating straight lines of opposite slope are drawn in a known manner through the existing end points of the single bar at the measuring position $x_i$. That is also readily possible at the measuring positions $x_1$ and $x_2$. The result is the straight line K1. A straight line can also be drawn through the bar ends at the measuring positions $x_3$ and $x_4$. This is shown by dashed lines. However, what is obtained then is an intersection $S_F$ with the straight line K1, which results in an incorrect leak location $x_F$. The distance between the actual leak location $x_L$ and the incorrectly ascertained leak location $x_F$ can be considerable. This is because the intersection $S_F$ could also not be located in the segment II but rather in the segment I located to the left of it.

Such an error does in fact occasionally occur in practice and the present invention seeks to largely eliminate it. The way in which this is done will be shown in principle by FIG. 2. The method has proven itself especially in the case where two sound-damping components are located in the region between two sensors, especially if such sound-damping components are also located in the vicinity of the leak.

Figure 2:
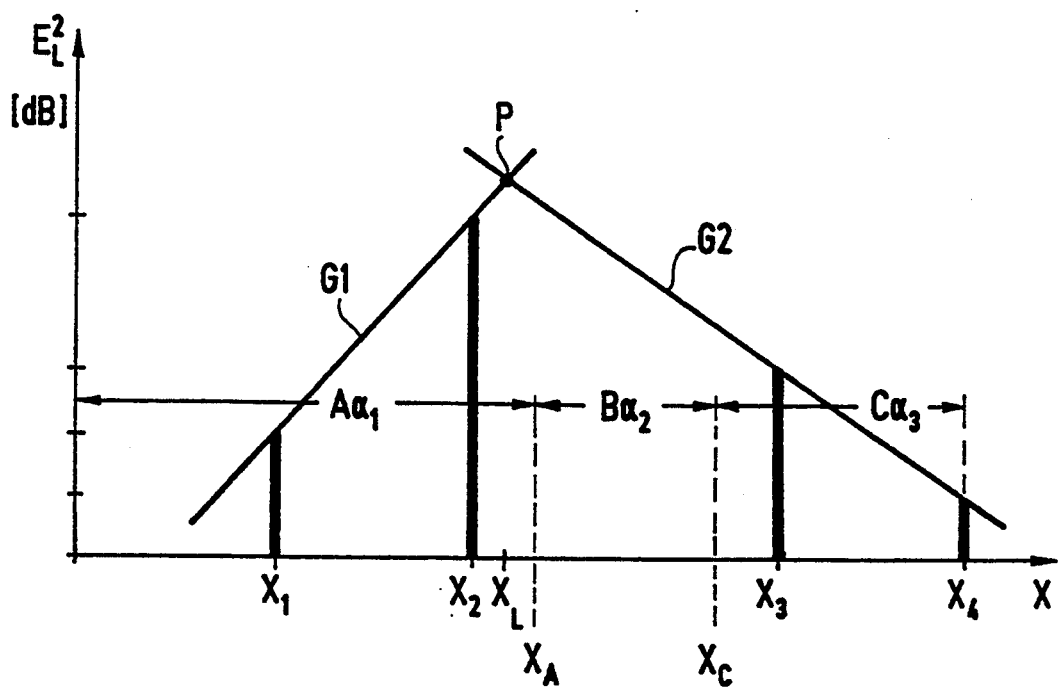
FIG. 2 is a bar diagram in which the aforementioned r.m.s. values are shown through effective location coordinates $X_i$.

According to the present invention, the measuring or monitoring segment, which extends from 0 through the measuring position $x_4$, is subdivided into the segments or subsegments A, B, C seen in FIG. 1, each of which has intrinsically uniform damping and therefore has a certain sound damping coefficient $\alpha_1$, $\alpha_2$ or $\alpha_3$. In FIG. 2, each of these subsegments A, B, C is then assigned an effective portion along an effective location coordinate axis X. The effective portions $A\alpha_1$, $B\alpha_2$, $C\alpha_3$ are each obtained by multiplication of the respective portions A, B, C by the associated damping coefficient $\alpha_1$, $\alpha_2$ and $\alpha_3$. They are plotted by amount along the X axis.

The effective location coordinates or measuring positions $X_1$, $X_2$, $X_3$ and $X_4$ are then ascertained. These effective location coordinates $X_1 \ldots X_4$ are obtained from the location coordinates $x_1 \ldots x_4$ of the measuring points by taking the various damping coefficients into account.

In the segment A, it is thus generally true that $X = \alpha_1 \cdot x$. In the segment B, it is true that $X = X_A + \alpha_2 \cdot (x - x_A)$. In the segment C, it is true that $X = X_C + \alpha_3 \cdot (x - x_C)$.

The effective location coordinates $X_1$, $X_2$, $X_3$ and $X_4$ for the four ultrasonic sensors are plotted in FIG. 2.

A bar diagram is then prepared. To that end, through the use of the effective location coordinates $X_1$, $X_2$, $X_3$ and $X_4$, the measured net sound level $E^2_L$ (in dB) in this case is plotted logarithmically.

Two compensating straight lines G1 and G2 that are inclined opposite one another can then be drawn through the end points of the bars. The intersection P of these two straight lines G1 and G2 is ascertained. The effective location coordinate $X_L$ of the intersection P identifies the actual or true leak point $x_L$. The latter is ascertained by reverse calculation using the equation $x_L = X_L / \alpha_1$.

These calculations are suitably performed with a computer. The leak location $x_L$ can then be displayed, for instance on a screen or on the printout of a plotter.

Figure 3:
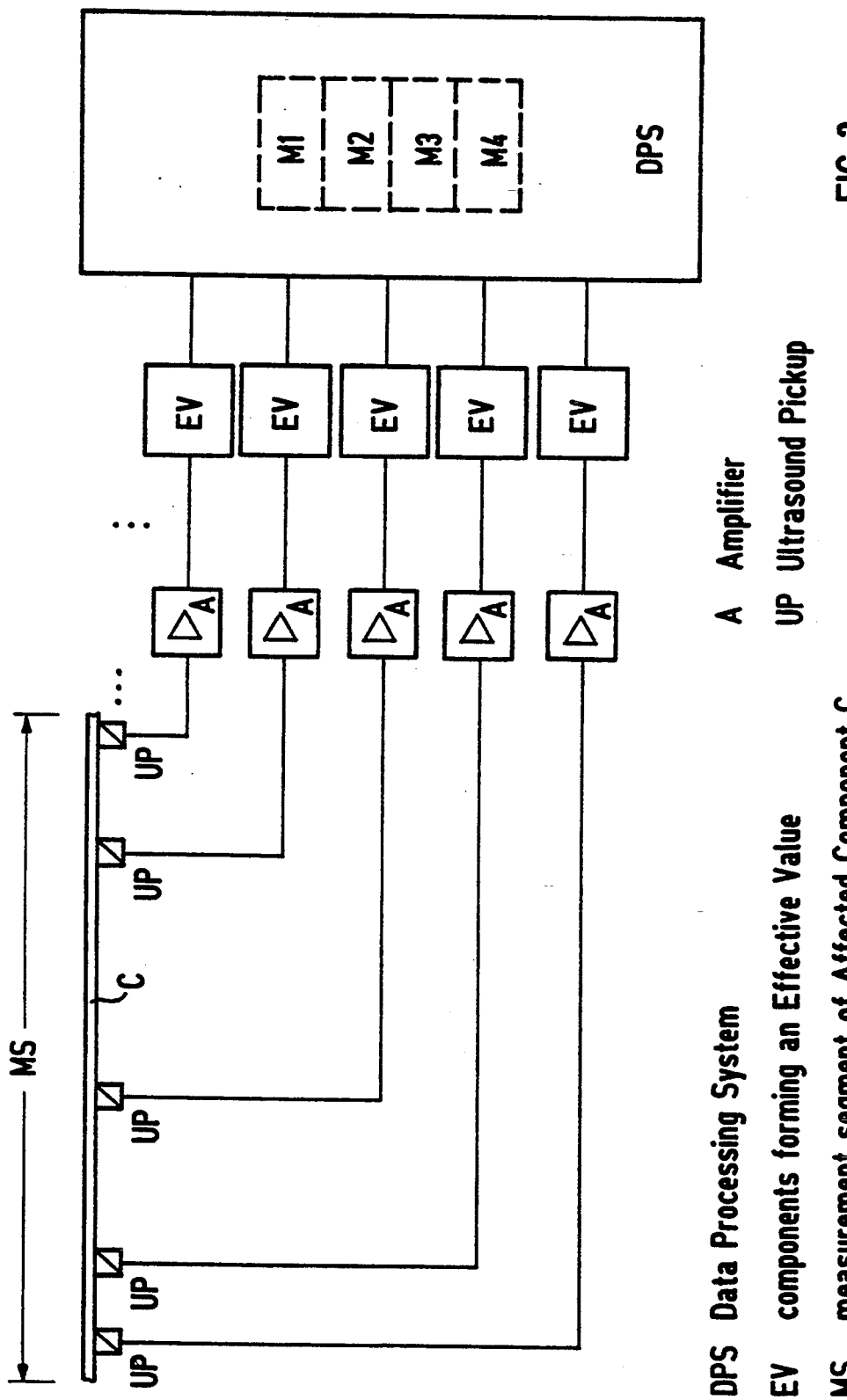
FIG. 3 illustrates a measuring segment of an affected component (e.g. pipe, valve, etc.) with several ultrasound pickups permanently mounted on it, amplifiers, components forming an effective value, and a data processing system.

As can be seen from FIG. 1 in connection with FIG. 3, (at least) two of the ultrasonic pickups UP are positioned at $x_1$ and $x_2$ within subsequent A, and (at least) two of them are positioned at $x_3$ within subsequent C.

FIG. 3 contains the principal measurement arrangement according to the invention. The drawing shows a measuring segment MS of an affected component C (e.g. pipe, valve, etc, herein simply drawn as straight pipe). A number of ultrasound pickups UP are disposed along the measuring segment MS and are fixly and permanently mounted at the affected component C. The output signals of the ultrasound pickups UP are lead to amplifiers A, which are connected to electrical components EV, the latter forming an effective value which will be processed within a data processing system DPS. The components EV forming the effective value may be stand alone components or may be parts of the data processing system DPS. The data processing system DPS is a computer having first means M1 for determining effective measuring positions from the measuring locations while taking damping along the measuring segment into account, second means M2 for preparing a bar diagram with the effective measuring positions with the aid of logarithmized effective values, third means M3 for inscribing two straight lines of different slope into the bar diagram, and fourth means M4 for characterizing an actual leak point by determining the intersection of the lines.

We claim:

1. A method for ultrasonic leak location, which comprises:
   a) showing sound levels in a bar diagram at various locations along a measurement segment;
   b) dividing the measuring segment into subsegments each having a length and an associated damping coefficient, each subsegment having uniform damping therewithin, and each subsegment being different from neighboring subsegments;
   c) obtaining effective subsegments by multiplying the lengths of the subsegments with the associated damping coefficient, and assigning an effective subsegment to each of the subsegments;
   d) ascertaining corresponding effective measuring locations for the measuring locations within the effective subsegments;
   e) plotting respective logarithmized net sound levels through the ascertained effective measuring locations, and producing two inclined straight lines as a result; and
   f) ascertaining an intersection of the straight lines in the bar diagram for identifying a leak point.

2. The method according to claim 1, which comprises displaying the leak location on a screen.

3. The method according to claim 1, which comprises displaying the leak location on a printout of a plotter.

4. An apparatus for ultrasonic leak location, comprising:
   a number of ultrasound pickups being disposed at measuring locations along a measuring segment and having outputs;
   a data processing system;
   amplifiers; and
   components producing an effective value, said amplifiers and said components being connected between the outputs of said ultrasound pickups and said data processing system;
   said data processing system being a computer having:
     means for determining effective measuring locations from the measuring locations by taking damping along the measuring segment into account,
     means for preparing a bar diagram with the effective measuring positions with the aid of logarithmized effective values,
     means for inscribing two straight lines of different slope along peaks in the bar diagram, and
     means for characterizing an actual leak point by determining the intersection of the lines.

5. The apparatus according to claim 4, wherein at least two of said ultrasonic pickups are positioned within separate subsegments with the same damping.

* * * * *